United States Patent
Zhang et al.

(10) Patent No.: US 12,393,874 B2
(45) Date of Patent: Aug. 19, 2025

(54) DATA PROCESSING SYSTEM AND METHOD

(71) Applicant: HUAWEI TECHNOLOGIES CO., LTD., Guangdong (CN)

(72) Inventors: Changzheng Zhang, Shenzhen (CN); Xiaolong Bai, Hangzhou (CN); Dandan Tu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 29 days.

(21) Appl. No.: 18/370,524

(22) Filed: Sep. 20, 2023

(65) Prior Publication Data
US 2024/0013098 A1 Jan. 11, 2024

Related U.S. Application Data

(63) Continuation of application No. 16/432,617, filed on Jun. 5, 2019, now abandoned, which is a continuation (Continued)

(30) Foreign Application Priority Data

Dec. 6, 2016 (CN) .......................... 201611110243.6

(51) Int. Cl.
*G06N 20/00* (2019.01)
*G06F 17/16* (2006.01)
(Continued)

(52) U.S. Cl.
CPC ............. *G06N 20/00* (2019.01); *G06F 17/16* (2013.01); *G06N 7/00* (2013.01); *G06N 3/08* (2013.01)

(58) Field of Classification Search
None
See application file for complete search history.

(56) References Cited

U.S. PATENT DOCUMENTS 9,350,690 B2   5/2016 Meijer et al.
9,652,722 B1 *  5/2017 Narsky ................. G06N 20/10
(Continued)

FOREIGN PATENT DOCUMENTS

CN    101826166 A    9/2010
CN    102521656 A    6/2012
(Continued)

OTHER PUBLICATIONS

Song et al. Stochastic gradient descent with differentially private updates, 978-1-4799-0248-4/13/$31.00 © 2013 IEEE, GlobalSIP 2013.*

(Continued)

*Primary Examiner* — David J Stoltenberg
(74) *Attorney, Agent, or Firm* — WOMBLE BOND DICKINSON (US) LLP

(57) ABSTRACT

Embodiments of the present invention disclose a data processing apparatus. The apparatus is configured to: after calculating a set of gradient information of each parameter by using a sample data subset, delete the sample data subset, read a next sample data subset, calculate another set of gradient information of each parameter by using the next sample data subset, and accumulate a plurality of sets of calculated gradient information of each parameter, to obtain an update gradient of each parameter.

19 Claims, 7 Drawing Sheets

Related U.S. Application Data of application No. PCT/CN2017/113581, filed on Nov. 29, 2017.

(51) Int. Cl.
*G06N 7/00* (2023.01)
*G06N 3/08* (2023.01)

(56) References Cited

U.S. PATENT DOCUMENTS

| | | | |
|---|---|---|---|
| 10,152,676 B1 | 12/2018 | Strom | |
| 10,282,809 B2 | 5/2019 | Jin et al. | |
| 11,308,418 B2* | 4/2022 | Schiemenz | G06N 20/00 |
| 2011/0264609 A1 | 10/2011 | Liu et al. | |
| 2013/0325401 A1 | 12/2013 | Bouchard | |
| 2014/0188462 A1 | 7/2014 | Zadeh | |
| 2014/0236871 A1 | 8/2014 | Fujimaki et al. | |
| 2015/0127590 A1 | 5/2015 | Gay et al. | |
| 2015/0234781 A1* | 8/2015 | Angerer | G06F 17/16 |
| | | | 708/446 |
| 2015/0324690 A1 | 11/2015 | Chilimbi et al. | |
| 2015/0379428 A1 | 12/2015 | Dirac et al. | |
| 2016/0078359 A1* | 3/2016 | Csurka | G06V 10/776 |
| | | | 706/12 |
| 2016/0078361 A1* | 3/2016 | Brueckner | H04L 67/10 |
| | | | 706/12 |
| 2016/0350649 A1 | 12/2016 | Zhang et al. | |
| 2017/0308789 A1 | 10/2017 | Langford et al. | |
| 2018/0329798 A1 | 11/2018 | Zhou | |
| 2019/0087744 A1* | 3/2019 | Schiemenz | G06N 20/00 |
| 2019/0279088 A1* | 9/2019 | Zhang | G06N 3/04 |

FOREIGN PATENT DOCUMENTS

| | | |
|---|---|---|
| CN | 103336877 A | 10/2013 |
| CN | 104463324 A | 3/2015 |
| CN | 104598972 A | 5/2015 |
| CN | 105469142 A | 4/2016 |
| CN | 105574585 A | 5/2016 |
| CN | 105677353 A | 6/2016 |
| CN | 105683944 A | 6/2016 |
| CN | 106062786 A | 10/2016 |
| CN | 106156810 A | 11/2016 |
| CN | 107330516 A | 11/2017 |
| JP | 2012079080 A | 4/2012 |
| WO | 2017185411 A1 | 11/2017 |

OTHER PUBLICATIONS

Huang Jiuling, Research and Application on Imbalanced Data Set Based on Ensemble Learning Classification, Harbin University of Technology, May 2015, 2 pages.

Minsoo Rhu et al, vDNN: Virtualized Deep Neural Networks for Scalable, Memory-Efficient Neural Network Design, 49th IEEE/ACM International Symposium on Microarchitecture (MICRO-49, arXiv:1602.08124v3 [cs.DC] Jul. 28, 2016, 13 pages.

Chen Mingzhong, Analysis and Compare of BP Neural Network's Training Arithmetic, Science Mosaic, 2010, Issue 03, 4 pages.

Small spoon digging Tarzan, Five algorithms for training neural networks, CSDN, Oct. 24, 2016, 14 pages, https://blog.csdn.net/baidu_32134295/article/details/52909687.

Aliaga R J et al: "SoC-Based Implementation of the Backpropagation Algorithm for MLP", Hybrid Intelligent Systems, 2008. HIS"08. Sep. 2008, pp. 744-749, XP031321915.

Data Mining: Concepts, Models, Methods, and Algorithms, Chapter 3 Data Reduction, Mehmed Kantardzic, 2003, Wiley-IEEE Press.

Xiaosheng Liu et al.,"Scalable Parallel EM Algorithms for Latent Dirichlet Allocation in Multi-Core Systems",May 18-22, 2015,total:11pages.

James McCaffrey et al.,"Variation on Back Propagation:Mini Batch Neural Network Training",Jun. 6, 2023,total:8pags.

\* cited by examiner

DATA PROCESSING SYSTEM AND METHOD

CROSS-REFERENCE TO RELATED APPLICATIONS

This application is a continuation of U.S. patent application Ser. No. 16/432,617, filed on Jun. 5, 2019, which is a continuation of International Application No. PCT/CN2017/113581, filed on Nov. 29, 2017. The International Application claims priority to Chinese Patent Application No. 201611110243.6, filed on Dec. 6, 2016. All of the aforementioned patent applications are hereby incorporated by reference in their entireties.

TECHNICAL FIELD

This application relates to the field of big data technologies, and in particular, to a data processing system and method.

BACKGROUND

With development of information technologies, enterprise big data is growing rapidly. Machine learning (including deep learning) is used to perform data analysis on the enterprise big data, and some rules can be drawn. These rules are used for many purposes, for example, may be used for prediction.

In the prior art, there is usually massive enterprise big data. Currently, how to increase a convergence speed of a machine learning model is an urgent problem to be resolved in a process of analyzing the enterprise big data by using a machine learning algorithm.

SUMMARY

In view of this, embodiments of the present invention provide a data processing system and method to increase a convergence speed of a machine learning model.

According to a first aspect, an embodiment of the present invention provides a data processing apparatus, where the data processing apparatus includes a gradient calculation module, an accumulation module, and a sending module, where the gradient calculation module is configured to: in a process of one iterative operation, sequentially read a plurality of sample data subsets from a sample data set, where the sample data subset includes at least one piece of sample data; enter each read sample data subset into a machine learning model; and calculate gradient information of each of a plurality of parameters of the machine learning model, where after a set of gradient information of each parameter is calculated by using one sample data subset, the sample data subset is deleted before a next sample data subset is read, and another set of gradient information of each parameter is calculated by using the next sample data subset; and the machine learning model is a machine learning model having an initialized global parameter, or is a machine learning model updated in a last iterative operation; the accumulation module is configured to: in the process of the one iterative operation, accumulate a plurality of sets of calculated gradient information of each parameter, to obtain an update gradient of each parameter; and the sending module is configured to send the update gradient of each parameter in the process of the one iterative operation, where the update gradient of each parameter is used to update the machine learning model.

In one embodiment, in each iterative operation, a sample data subset read last time is deleted, and therefore the data processing apparatus can read a sample data subset from the sample data set again. In this way, the data processing apparatus can read a sample data subset from the sample data set for a plurality of times, calculate a plurality of sets of gradient information, and accumulate the plurality of sets of gradient information. Therefore, sufficient sample data can be provided to calculate an update gradient, thereby increasing a convergence speed of a large-scale machine learning model. In addition, the data processing apparatus accumulates gradient information calculated based on each of the plurality of sample data subsets and then sends accumulated gradient information to the model update module, reducing a quantity of times of communication between the model update module and the data processing apparatus. Because the quantity of times of communication between the model update module and the data processing apparatus is reduced, time taken for communication between the model update module and the data processing apparatus is correspondingly reduced, thereby reducing total time of a plurality of iterative operations and increasing a speed of machine learning.

In one embodiment, the gradient calculation module, the accumulation module, and the sending module are further configured to participate in a plurality of iterative operations after the one iterative operation, until the machine learning model converges or a specified quantity of iterations are completed in calculation; in each of the plurality of iterative operations after the one iterative operation, the gradient calculation module, the accumulation module, and the sending module repeat the actions in the process of the one iterative operation; and in the one iterative operation and the plurality of iterative operations after the one iterative operation, after the machine learning model is updated by using an update gradient obtained in an iterative operation, a next iterative operation is performed.

In one embodiment, the accumulation module is configured to: for the plurality of sets of gradient information of each parameter that are obtained based on the plurality of read sample data subsets, accumulate a plurality of sets of gradient information of a same parameter, to obtain the update gradient of each parameter.

In one embodiment, the accumulation module is configured to: for one set of gradient information of each parameter obtained based on each sample data subset, accumulate one set of gradient information of a same parameter, to obtain an accumulation gradient of each parameter, so that a plurality of accumulation gradients of each parameter are obtained based on the plurality of read sample data subsets, and accumulate the plurality of accumulation gradients of each parameter, to obtain the update gradient of each parameter.

In one embodiment, the accumulation module is configured to: for the plurality of sets of gradient information of each parameter that are obtained based on the plurality of read sample data subsets, collect a plurality of sets of gradient information of a same parameter together, where the plurality of sets of gradient information of each parameter that are collected together are used as the update gradient of each parameter.

In one embodiment, a weighted averaging method is used in the accumulation processing.

In one embodiment, a manner of extracting some gradient information and performing weighted processing is used in the accumulation processing.

In one embodiment, the gradient calculation module is configured to: in the process of the one iterative operation, sequentially read the plurality of sample data subsets from the sample data set; enter each read sample data subset into the machine learning model; read and use an intermediate calculation result, to calculate the gradient information of each of the plurality of parameters of the machine learning model, where the intermediate calculation result is used as input information to calculate the gradient information, and after a set of gradient information of each parameter is calculated by using one sample data subset, the sample data subset is deleted before a next sample data subset is read, and another set of gradient information of each parameter is calculated by using the next sample data subset; and after the intermediate calculation result is used, delete the intermediate calculation result, where an operation of deleting the intermediate calculation result needs to be completed before the next sample data subset is read.

After calculating the gradient information, the calculation module deletes the intermediate calculation result, releasing storage resources occupied by the intermediate calculation result in a memory and vacating storage space for a to-be-read sample data subset. In this way, the to-be-read sample data subset may include relatively much sample data.

In one embodiment, the intermediate calculation result is calculated based on the sample data subset, and one intermediate calculation result is obtained correspondingly based on one sample data subset; and in a process of calculating gradient information by using one sample data subset, an intermediate calculation result corresponding to the sample data subset is used as input information to calculate the gradient information.

In one embodiment, the data processing apparatus further includes a preprocessing unit, and the preprocessing unit is configured to: in a process in which the calculation module enters one sample data subset into the machine learning model and calculates gradient information of each parameter of the machine learning model, preprocess a next sample data subset, and correspondingly obtain an intermediate calculation result of the next sample data subset. The intermediate calculation result is used as input information for calculation in a process in which the calculation module enters the next sample data subset into the machine learning model and calculates gradient information of each of the plurality of parameters of the machine learning model.

In one embodiment, the gradient calculation module is specifically configured to: enter each sample data subset into the machine learning model, and calculate gradient information of each of the plurality of parameters of the machine learning model in a process of each iterative operation, where one piece of gradient information of each parameter is obtained correspondingly based on one piece of sample data in the sample data subset, and the sample data subset includes at least one piece of sample data; and correspondingly, one set of gradient information of each parameter is obtained correspondingly based on one sample data subset, where the one set of gradient information includes at least one piece of gradient information.

In one embodiment, each parameter is each of the plurality of parameters whose fitted values need to be obtained in the machine learning model through machine learning.

In one embodiment, each parameter is each of all parameters in the machine learning model.

In one embodiment, each parameter is each of some parameters in the machine learning model.

In one embodiment, the gradient calculation module is specifically configured to: in each iterative operation, enter each sample data subset into the machine learning model, and perform forward calculation and backward calculation to obtain the gradient information of each parameter.

In one embodiment, the machine learning model having the initialized global parameter is a machine learning model in which some or all parameters have initial values.

In one embodiment, the specified quantity of iterations is a quantity of iterations that meets a requirement on precision of the machine learning model.

According to a second aspect, an embodiment of the present invention further provides a data processing system, where the system includes a model update module and the data processing apparatus as described above, where the sending module is further configured to send the update gradient of each parameter to the model update module in the process of the one iterative operation; and the model update module is configured to: in the process of the one iterative operation, receive the update gradient of each parameter, and update the machine learning model by using the update gradient of each parameter.

In one embodiment, there is one data processing apparatus, and there is one model update module.

In one embodiment, there are a plurality of data processing apparatuses, and there is one model update module; and the model update module is further configured to: in the process of the one iterative operation, receive an update gradient of each parameter sent by each of sending modules of the plurality of data processing apparatuses, and update the machine learning model by using the update gradient of each parameter from each of the sending modules of the plurality of data processing apparatuses.

In one embodiment, if there are a plurality of data processing apparatuses, in one iterative operation, a total quantity of sample data subsets read by the plurality of data processing apparatuses from the sample data set is a quantity of sample data subsets required for one iterative operation of the machine learning model.

In one embodiment, sample data subsets read by the plurality of data processing apparatuses in one iterative operation are different.

In one embodiment, there may be a plurality of data processing apparatuses, and there are also a plurality of model update modules.

In one embodiment, the plurality of data processing apparatuses and the plurality of model update modules may be carried on one computing node, the computing node includes a plurality of processors, and one processor carries one data processing apparatus and one model update module; a sending module of a data processing apparatus of each processor is further configured to: in the process of the one iterative operation, send a calculated update gradient of each parameter to model update modules of all other processors, and send the update gradient of each parameter to a model update module that is on the same processor as the data processing apparatus; and a model update module of each processor is further configured to: in the process of the one iterative operation, receive an update gradient of each parameter sent by a sending module of a data processing apparatus of each of the other processors; update the machine learning model by using the update gradient of each parameter from each of the other processors; and update the machine learning model by using an update gradient of each parameter calculated by a data processing apparatus that is on the same processor as the model update module.

In one embodiment, if there are a plurality of data processing apparatuses, in one iterative operation, a total quantity of sample data subsets read by the plurality of data processing apparatuses from the sample data set is a quantity of sample data subsets required for one iterative operation of the machine learning model.

In one embodiment, sample data subsets read by the plurality of data processing apparatuses in one iterative operation are different.

In one embodiment, the model update module may include an integration module and a plurality of service modules, and there are a plurality of data processing apparatuses; the sending module of the data processing apparatus is specifically configured to: in the process of the one iterative operation, send an update gradient of each set of parameters to a corresponding service module, where the plurality of parameters of the machine learning model include a plurality of sets of parameters, each set of parameters includes at least one parameter, and each set of the plurality of sets of parameters is corresponding to a different service module; each of the plurality of service modules is configured to: in the process of the one iterative operation, receive an update gradient of a set of parameters corresponding to the service module; update, by using the update gradient of the set of parameters, a part that is of the machine learning model and that corresponds to the set of parameters; and send an updated partial machine learning model to the integration module; and the integration module is configured to: in the process of the one iterative operation, receive updated partial machine learning models sent by the plurality of service modules, and integrate the plurality of updated partial machine learning models into an updated entire machine learning model.

In one embodiment, each of the plurality of service modules is specifically configured to: in the process of the one iterative operation, update, according to a model update formula of stochastic gradient descent and by using the update gradient of the set of parameters, the part that is of the machine learning model and that corresponds to the set of parameters.

In one embodiment, if there is a plurality of data processing apparatuses, in one iterative operation, a total quantity of sample data subsets read by the plurality of data processing apparatuses from the sample data set is a quantity of sample data subsets required for one iterative operation of the machine learning model.

In one embodiment, sample data subsets read by the plurality of data processing apparatuses in one iterative operation are different.

In one embodiment, the model update module is configured to: in the process of the one iterative operation, update the machine learning model according to the model update formula of stochastic gradient descent and by using the update gradient of each parameter.

In one embodiment, in a process in which the update gradient is transferred between the modules, the update gradient may be presented as a model updated by using the update gradient.

According to a third aspect, an embodiment of the present invention further provides a data processing system, where the system includes a model update module and the data processing apparatus in any one of the first to the sixteenth possible implementations of the first aspect, where the sending module is further configured to send an update gradient of each parameter to the model update module in the one iterative operation and each of the plurality of iterative operations after the one iterative operation; and the model update module is configured to: in the one iterative operation and each of the plurality of iterative operations after the one iterative operation, receive the update gradient of each parameter, and update the machine learning model by using the update gradient of each parameter.

In one embodiment, there is one data processing apparatus, and there is one model update module.

In one embodiment, there are a plurality of data processing apparatuses, and there is one model update module; and the model update module is further configured to: in the one iterative operation and each of the plurality of iterative operations after the one iterative operation, receive an update gradient of each parameter sent by each of sending modules of the plurality of data processing apparatuses, and update the machine learning model by using the update gradient of each parameter from each of the sending modules of the plurality of data processing apparatuses.

In one embodiment, if there are a plurality of data processing apparatuses, in one iterative operation, a total quantity of sample data subsets read by the plurality of data processing apparatuses from the sample data set is a quantity of sample data subsets required for one iterative operation of the machine learning model.

In one embodiment, sample data subsets read by the plurality of data processing apparatuses in one iterative operation are different.

In one embodiment, there may be a plurality of data processing apparatuses, and there are also a plurality of model update modules.

In one embodiment, the plurality of data processing apparatuses and the plurality of model update modules may be carried on one computing node, the computing node includes a plurality of processors, and one processor carries one data processing apparatus and one model update module; a sending module of a data processing apparatus of each processor is further configured to: in the one iterative operation and each of the plurality of iterative operations after the one iterative operation, send a calculated update gradient of each parameter to model update modules of all other processors, and send the update gradient of each parameter to a model update module that is on the same processor as the data processing apparatus; and a model update module of each processor is further configured to: in the one iterative operation and each of the plurality of iterative operations after the one iterative operation, receive an update gradient of each parameter sent by a sending module of a data processing apparatus of each of the other processors; update the machine learning model by using the update gradient of each parameter from each of the other processors; and update the machine learning model by using an update gradient of each parameter calculated by a data processing apparatus that is on the same processor as the model update module.

In one embodiment, if there are a plurality of data processing apparatuses, in one iterative operation, a total quantity of sample data subsets read by the plurality of data processing apparatuses from the sample data set is a quantity of sample data subsets required for one iterative operation of the machine learning model.

In one embodiment, sample data subsets read by the plurality of data processing apparatuses in one iterative operation are different.

In one embodiment, the model update module includes an integration module and a plurality of service modules, and there are a plurality of data processing apparatuses; the sending module of the data processing apparatus is specifically configured to: in the one iterative operation and each of the plurality of iterative operations after the one iterative operation, send an update gradient of each set of parameters to a corresponding service module, where the plurality of parameters of the machine learning model include a plurality of sets of parameters, each set of parameters includes at least one parameter, and each set of the plurality of sets of parameters is corresponding to a different service module; each of the plurality of service modules is configured to: receive an update gradient of a set of parameters corresponding to the service module; update, by using the update gradient of the set of parameters, a part that is of the machine learning model and that corresponds to the set of parameters; and send an updated partial machine learning model to the integration module; and the integration module is configured to: in the one iterative operation and each of the plurality of iterative operations after the one iterative operation, receive updated partial machine learning models sent by the plurality of service modules, and integrate the plurality of updated partial machine learning models into an updated entire machine learning model.

In one embodiment, each of the plurality of service modules is specifically configured to: in the one iterative operation and each of the plurality of iterative operations after the one iterative operation, update, according to a model update formula of stochastic gradient descent and by using the update gradient of the set of parameters, the part that is of the machine learning model and that corresponds to the set of parameters.

In one embodiment, if there are a plurality of data processing apparatuses, in one iterative operation, a total quantity of sample data subsets read by the plurality of data processing apparatuses from the sample data set is a quantity of sample data subsets required for one iterative operation of the machine learning model.

In one embodiment, sample data subsets read by the plurality of data processing apparatuses in one iterative operation are different.

In one embodiment, the model update module is specifically configured to: in the one iterative operation and each of the plurality of iterative operations after the one iterative operation, update the machine learning model according to the model update formula of stochastic gradient descent and by using the update gradient of each parameter.

In one embodiment, in a process in which the update gradient is transferred between the modules, the update gradient may be presented as a model updated by using the update gradient.

According to a fourth aspect, an embodiment of the present invention further provides a data processing system, where the system includes at least one computing node, and the at least one computing node is configured to carry the data processing apparatus as described above.

In one embodiment, the computing node may include at least one processor and a memory configured for the processor, and the data processing apparatus is carried on the processor.

In one embodiment, in a second possible implementation, in each iterative operation, a plurality of sample data subsets sequentially read by the data processing apparatus from the sample data set are stored in a memory of the data processing apparatus; and after gradient information of each parameter is calculated by using one sample data subset, the sample data subset is deleted from the memory before a next sample data subset is read into the memory, and the memory of the data processing apparatus is the memory of the processor carrying the data processing apparatus.

In one embodiment, storage space occupied by one sample data subset is less than or equal to storage space, reserved for the sample data subset, in the memory of the data processing apparatus, and storage space occupied by two sample data subsets is greater than the storage space, reserved for the sample data subset, in the memory of the data processing apparatus.

In one embodiment, in each iterative operation, the data processing apparatus is further configured to: sequentially read the plurality of sample data subsets from the sample data set; enter each read sample data subset into the machine learning model; read and use an intermediate calculation result, to calculate gradient information of each of the plurality of parameters of the machine learning model, where the intermediate calculation result is used as input information to calculate the gradient information, and after a set of gradient information of each parameter is calculated by using one sample data subset, the sample data subset is deleted before a next sample data subset is read, and another set of gradient information of each parameter is calculated by using the next sample data subset; and after the intermediate calculation result is used, delete the intermediate calculation result, where an operation of deleting the intermediate calculation result needs to be completed before the next sample data subset is read.

After calculating the gradient information, the data processing apparatus deletes the intermediate calculation result, releasing storage resources occupied by the intermediate calculation result in the memory and vacating storage space for a to-be-read sample data subset. In this way, the to-be-read sample data subset may include relatively much sample data.

In one embodiment, the intermediate calculation result is calculated based on the sample data subset, and one intermediate calculation result is obtained correspondingly based on one sample data subset; and in a process of calculating gradient information by using one sample data subset, an intermediate calculation result corresponding to the sample data subset is used as input information to calculate the gradient information.

In one embodiment, the data processing system further includes a preprocessing unit, and the preprocessing unit is configured to: in a process in which the data processing apparatus enters one sample data subset into the machine learning model and calculates gradient information of each parameter of the machine learning model, preprocess a next sample data subset, and correspondingly obtain an intermediate calculation result of the next sample data subset. The intermediate calculation result is used as input information for calculation in a process in which the data processing apparatus enters the next sample data subset into the machine learning model and calculates gradient information of each of the plurality of parameters of the machine learning model.

In one embodiment, the preprocessing unit may be separately carried on one processor, or the preprocessing unit and the data processing apparatus may be carried on one processor.

According to a fifth aspect, an embodiment of the present invention further provides another data processing system, where the system includes at least one computing node, and the at least one computing node is configured to carry the data processing apparatus and the model update module as described above.

In one embodiment, the computing node may include at least one processor and a memory configured for the processor, and the data processing apparatus and the model update module are carried on the processor.

In one embodiment, in each iterative operation, a plurality of sample data subsets sequentially read by the data processing apparatus from the sample data set are stored in a memory of the data processing apparatus; and after gradient information of each parameter is calculated by using one sample data subset, the sample data subset is deleted from the memory before a next sample data subset is read into the memory, and the memory of the data processing apparatus is the memory of the processor carrying the data processing apparatus.

In one embodiment, storage space occupied by one sample data subset is less than or equal to storage space, reserved for the sample data subset, in the memory of the data processing apparatus, and storage space occupied by two sample data subsets is greater than the storage space, reserved for the sample data subset, in the memory of the data processing apparatus.

In one embodiment, in each iterative operation, the data processing apparatus is further configured to: in a process of entering each sample data subset into the machine learning model and calculating gradient information of each of the plurality of parameters of the machine learning model, read and use an intermediate calculation result stored in the memory of the data processing apparatus, where the intermediate calculation result is used as input information to calculate the gradient information; and after the intermediate calculation result is used, delete the intermediate calculation result from the memory of the data processing apparatus, where an operation of deleting the intermediate calculation result needs to be completed before a next sample data subset is read into the memory of the data processing apparatus.

After calculating the gradient information, the data processing apparatus deletes the intermediate calculation result, releasing storage resources occupied by the intermediate calculation result in the memory and vacating storage space for a to-be-read sample data subset. In this way, the to-be-read sample data subset may include relatively much sample data.

In one embodiment, the intermediate calculation result is calculated based on the sample data subset, and one intermediate calculation result is obtained correspondingly based on one sample data subset; and in a process of calculating gradient information by using one sample data subset, an intermediate calculation result corresponding to the sample data subset is used as input information to calculate the gradient information.

In one embodiment, the data processing system further includes a preprocessing unit, and the preprocessing unit is configured to: in a process in which the data processing apparatus enters one sample data subset into the machine learning model and calculates gradient information of each parameter of the machine learning model, preprocess a next sample data subset, and correspondingly obtain an intermediate calculation result of the next sample data subset. The intermediate calculation result is used as input information for calculation in a process in which the data processing apparatus enters the next sample data subset into the machine learning model and calculates gradient information of each of the plurality of parameters of the machine learning model.

In one embodiment, the preprocessing unit may be separately carried on one processor, or the preprocessing unit and the data processing apparatus may be carried on one processor.

According to a sixth aspect, an embodiment of the present invention further provides a data processing method, where the method includes one iterative operation, and the one iterative operation includes: in a process of the one iterative operation, sequentially reading a plurality of sample data subsets from a sample data set, where the sample data subset includes at least one piece of sample data; entering each read sample data subset into a machine learning model; and calculating gradient information of each of a plurality of parameters of the machine learning model, where after a set of gradient information of each parameter is calculated by using one sample data subset, the sample data subset is deleted before a next sample data subset is read, and another set of gradient information of each parameter is calculated by using the next sample data subset; and the machine learning model is a machine learning model having an initialized global parameter, or is a machine learning model updated in a last iterative operation; and in the process of the one iterative operation, accumulating a plurality of sets of calculated gradient information of each parameter, to obtain an update gradient of each parameter, where the update gradient of each parameter is used to update the machine learning model.

In one embodiment, the method further includes a plurality of iterative operations after the one iterative operation, until the machine learning model converges or a specified quantity of iterations are completed in calculation, where in each of the plurality of iterative operations after the one iterative operation, the steps in the one iterative operation are repeated; and in each of the plurality of iterative operations after the one iterative operation, after the machine learning model is updated by using an update gradient obtained in an iterative operation, a next iterative operation is performed.

In one embodiment, the method in each iterative operation further includes: updating the machine learning model by using the update gradient of each parameter.

In one embodiment, a process of accumulating, in each iterative operation, a plurality of sets of calculated gradient information of each parameter, to obtain an update gradient of each parameter includes: for the plurality of sets of gradient information of each parameter that are obtained based on the plurality of read sample data subsets, accumulating a plurality of sets of gradient information of a same parameter, to obtain the update gradient of each parameter.

In one embodiment, a process of accumulating, in each iterative operation, a plurality of sets of calculated gradient information of each parameter, to obtain an update gradient of each parameter includes: for one set of gradient information of each parameter obtained based on each sample data subset, accumulating one set of gradient information of a same parameter, to obtain an accumulation gradient of each parameter, so that a plurality of accumulation gradients of each parameter are obtained based on the plurality of read sample data subsets, and accumulating the plurality of accumulation gradients of each parameter, to obtain the update gradient of each parameter.

In one embodiment, a process of accumulating, in each iterative operation, a plurality of sets of calculated gradient information of each parameter, to obtain an update gradient of each parameter includes: for the plurality of sets of gradient information of each parameter that are obtained based on the plurality of read sample data subsets, collecting a plurality of sets of gradient information of a same parameter together, where the plurality of sets of gradient information of each parameter that are collected together are used as the update gradient of each parameter.

In one embodiment, a weighted averaging method is used in the accumulation processing.

In one embodiment, a manner of extracting some gradient information and performing weighted processing is used in the accumulation processing.

In one embodiment, each parameter is each of the plurality of parameters whose fitted values need to be obtained in the machine learning model through machine learning.

In one embodiment, each parameter is each of all parameters in the machine learning model.

In one embodiment, each parameter is each of some parameters in the machine learning model.

In one embodiment, in a process of entering each sample data subset into the machine learning model and calculating gradient information of each of the plurality of parameters of the machine learning model in a process of each iterative operation, one piece of gradient information of each parameter is obtained correspondingly based on one piece of sample data in the sample data subset, where the sample data subset includes at least one piece of sample data; and correspondingly, one set of gradient information of each parameter is obtained correspondingly based on one sample data subset, where the one set of gradient information includes at least one piece of gradient information.

In one embodiment, a process of entering each sample data subset into the machine learning model and calculating gradient information of each of the plurality of parameters of the machine learning model in each iterative operation includes: entering each sample data subset into the machine learning model, and performing forward calculation and backward calculation to obtain the gradient information of each parameter.

In one embodiment, updating the machine learning model by using an update gradient of each parameter in each iterative operation specifically includes: updating the machine learning model according to a model update formula of stochastic gradient descent and by using the update gradient of each parameter.

In one embodiment, the machine learning model having the initialized global parameter is a machine learning model in which some or all parameters have initial values.

In one embodiment, the specified quantity of iterations is a quantity of iterations that meets a requirement on precision of the machine learning model.

In one embodiment, in a process in which the update gradient is transferred between the modules, the update gradient may be presented as a model updated by using the update gradient.

In one embodiment, the method runs on at least one computing node.

In one embodiment, the computing node may include at least one processor and a memory configured for the processor.

In one embodiment, in each iterative operation, the plurality of sample data subsets sequentially read from the sample data set are stored in the memory, and after gradient information of each parameter is calculated by using one sample data subset, the sample data subset is deleted from the memory before a next sample data subset is read into the memory.

In one embodiment, storage space occupied by one sample data subset is less than or equal to storage space, reserved for the sample data subset, in the memory, and storage space occupied by two sample data subsets is greater than the storage space, reserved for the sample data subset, in the memory.

In one embodiment, the method further includes: in each iterative operation, in a process of entering each sample data subset into the machine learning model and calculating gradient information of each of the plurality of parameters of the machine learning model, reading and using an intermediate calculation result stored in the memory, where the intermediate calculation result is used as input information to calculate the gradient information; and after the intermediate calculation result is used, deleting the intermediate calculation result from the memory, where an operation of deleting the intermediate calculation result needs to be completed before a next sample data subset is read into the memory.

After calculating the gradient information, a data processing apparatus deletes the intermediate calculation result, releasing storage resources occupied by the intermediate calculation result in the memory and vacating storage space for a to-be-read sample data subset. In this way, the to-be-read sample data subset may include relatively much sample data.

In one embodiment, the intermediate calculation result is calculated based on the sample data subset, and one intermediate calculation result is obtained correspondingly based on one sample data subset; and in a process of calculating gradient information by using one sample data subset, an intermediate calculation result corresponding to the sample data subset is used as input information to calculate the gradient information.

In one embodiment, the method further includes a preprocessing process, and the preprocessing process includes: in a process of entering one sample data subset into the machine learning model and calculating gradient information of each parameter of the machine learning model, preprocessing a next sample data subset, and correspondingly obtaining an intermediate calculation result of the next sample data subset. The intermediate calculation result is used as input information for calculation in a process of entering the next sample data subset into the machine learning model and calculating gradient information of each of the plurality of parameters of the machine learning model.

According to a seventh aspect, an embodiment of the present invention further provides a computing device. The computing device includes a mainboard, and a processor, a memory, a bus, and a communications interface that are connected by using the mainboard. The processor is connected to the memory by using the bus. When the computing device runs, the processor reads and executes an instruction in the memory or runs a hardware logic circuit of the processor, to make the computing device perform the method in the implementations of the sixth aspect, and reads the sample data subset into the memory by using the communications interface.

According to an eighth aspect, an embodiment of the present invention further provides a computer-readable storage medium. The computer-readable storage medium is configured to store program code, and the program code is used to perform the method in the implementations of the sixth aspect.

In one embodiment, a meaning of "converge" is as follows: When a machine learning model obtains relatively high precision, a learning process of iterative operation is continued; and when the machine learning model cannot obtain higher precision, it is considered that the machine learning model has converged.

A meaning of "gradient" is as follows: A gradient of a function of a machine learning model at a point is a vector whose direction is consistent with a direction in which a maximum direction derivative is obtained and whose modulus is a maximum value of a direction derivative. It should be noted that: (1) the gradient is a vector with both a direction and a size; (2) the direction of the gradient is the direction of the maximum direction derivative; and (3) a value of the gradient is a value of the maximum direction derivative. Specifically, a gradient calculation manner may be as follows: Derivation calculation is performed on parameters of the machine learning model by using a target function of the machine learning model, and a derivative obtained is a gradient of the parameters of the machine learning model.

A meaning of "update gradient" is information used to update parameters of a machine learning model, and is obtained through accumulation of a plurality of pieces of gradient information, or may be only one piece of gradient information. The update gradient is used to update the parameters in the machine learning model to cause the machine learning model to converge.

A meaning of "a plurality of sets of gradient information" is two or more sets of gradient information, for example, three, four, five, or six sets of gradient information. Each set of gradient information is calculated based on one sample data subset.

DESCRIPTION OF EMBODIMENTS

Various data processing system embodiments, data processing apparatus embodiments, data processing method embodiments, and storage media that are provided in the present invention are all applicable to a machine learning scenario.

Figure 1:
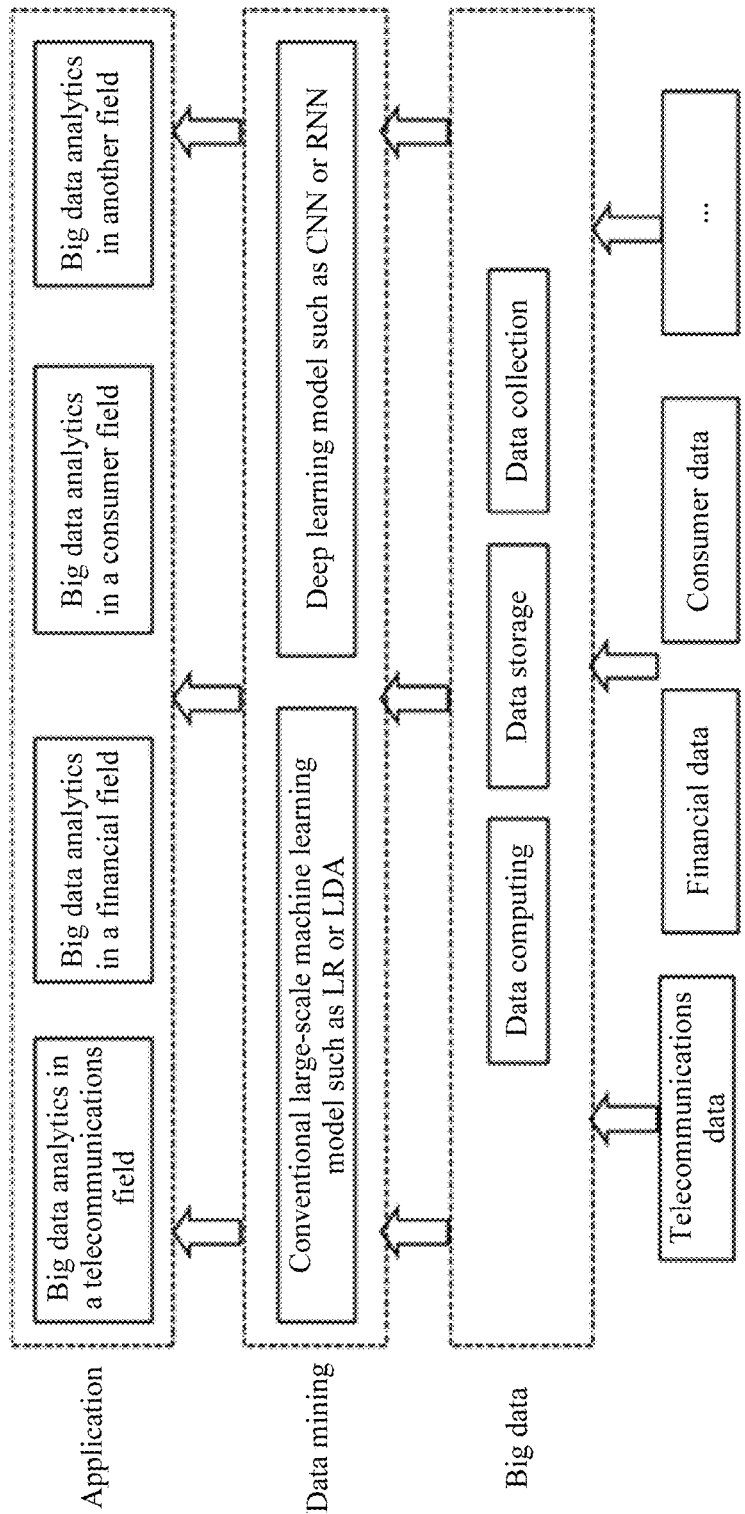
FIG. 1 is a schematic diagram of a machine learning process.

As shown in FIG. 1, machine learning is a process of discovering distribution rules of various types of big data such as telecommunications data, financial data, and consumer data. The distribution rules can provide guidance for analysis and prediction of future data, and therefore can support business decision-making and business operation.

Specifically, big data is generally a set of sample data, and includes much more sample data. Each piece of sample data includes many characteristics, and each characteristic is used as a dimension of the sample data. The sample data in the sample data set is used to train a machine learning model. The machine learning model may include millions or even tens of millions of parameters. Through combined effect of these parameters, a complex model can be built for a complex scenario. A single parameter is a weight obtained through machine learning.

In a machine learning process, sample data is entered into a machine learning model, and fitted values of parameters are obtained after a plurality of iterative operations, so that a machine learning model that can reflect a distribution rule of the big data is obtained. Generally, a larger quantity of iterative operations indicates better convergence of the model, and better convergence of the model indicates that the parameters are better fitted to the sample data.

Embodiment of First Data Processing System

Figure 2:
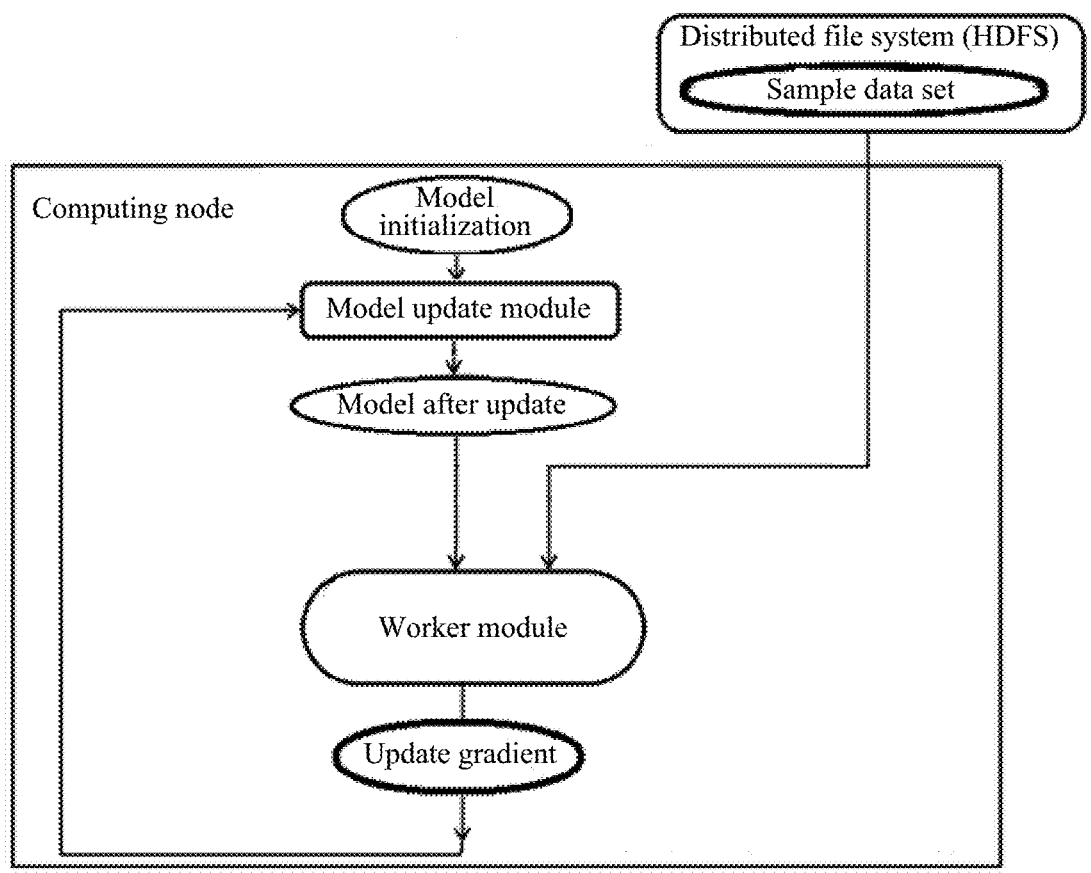
FIG. 2 is a schematic diagram of a first data processing system according to an embodiment of the present invention.

As shown in FIG. 2, the present invention provides an embodiment of a first data processing system, which includes at least one computing node. The at least one computing node is configured to carry a worker module (which may also be referred to as a working module) and a model update module. The worker module and the model update module are configured to: enter sample data in a sample data set into a machine learning model, and perform a plurality of iterative operations, until the machine learning model converges or a specified quantity of iterations are completed in calculation.

In a First Iterative Operation:

The worker module is further configured to: sequentially read a plurality of sample data subsets (also referred to as minibatch) from the sample data set, where the sample data subset includes at least one piece of sample data; enter each read sample data subset into a machine learning model having an initialized global parameter; calculate gradient information of each of a plurality of parameters of the machine learning model, where after a set of gradient information of each parameter is calculated by using one sample data subset, the sample data subset is deleted before a next sample data subset is read, and another set of gradient information of each parameter is calculated by using the next sample data subset;

accumulate a plurality of sets of calculated gradient information of each parameter, to obtain an update gradient of each parameter; and send the update gradient of each parameter to the model update module; and the model update module is further configured to: receive the update gradient of each parameter, and update the machine learning model by using the update gradient of each parameter.

In a Second Iterative Operation:

The worker module is further configured to: sequentially read the plurality of sample data subsets from the sample data set; enter each read sample data subset into an updated machine learning model; calculate gradient information of each of the plurality of parameters of the machine learning model, where after a set of gradient information of each parameter is calculated by using one sample data subset, the sample data subset is deleted before a next sample data subset is read, and another set of gradient information of each parameter is calculated by using the next sample data subset; accumulate a plurality of sets of calculated gradient information of each parameter, to obtain a new update gradient of each parameter; and send the newly obtained update gradient of each parameter to the model update module. The model update module is further configured to: receive the newly obtained update gradient of each parameter, and update the machine learning model again by using the newly obtained update gradient of each parameter.

In a subsequent iterative operation, the model update module repeats the actions in the second iterative operation, and the worker module also repeats the actions in the second iterative operation. After the machine learning model is updated by using an update gradient obtained in an iterative operation, a next iterative operation is performed.

Specifically, in the foregoing embodiment of the data processing system, each parameter is each of the plurality of parameters whose fitted values need to be obtained in the machine learning model through machine learning. Each parameter may be each of all parameters of the machine learning model, or may be each of only some parameters of the machine learning model.

It should be noted that a plurality of iterative operations are completed in the foregoing embodiment of the data processing system. Alternatively, only one iterative operation may be performed in the foregoing embodiment of the data processing system.

Technical Effects

In the foregoing embodiment, in an iterative operation, the worker module may read a sample data subset from the sample data set for a plurality of times, calculate a plurality of sets of gradient information, and accumulate the plurality of sets of gradient information. Even if a memory of the worker module cannot carry too much sample data, data reading can be performed, because in each time of data reading, sample data required for calculating only one set of gradient information needs to be read into the memory of the worker module. After a set of gradient information is calculated, the set of gradient information is recorded. Then, a sample data subset for calculating a next set of gradient information is read, and a previous sample data subset is overwritten by the read sample data subset; or memory space occupied by a previous sample data subset is released before a sample data subset is read. In this way, the memory of the worker module only needs to carry the sample data for calculating one set of gradient information, and the memory of the worker module does not need to have a large amount of storage space. An advantage is: Even if the storage space of the memory of the worker module is limited, an update gradient calculated based on sufficient sample data can be provided. This avoids the following problem: In each iterative operation, there is no sufficient sample data for calculating an update gradient, and therefore in a process of stochastic gradient descent in repeated iterative operations, a convergence speed of the machine learning model becomes low or even the machine learning model cannot converge because a gradient variance is excessively large and the model diverges. Particularly, in an iterative operation process of a large-scale machine learning model (for example, a deep learning model) having a relatively large quantity of parameters or a sample data set including a large amount of data, a convergence speed of the large-scale machine learning model can be increased without increasing the storage space of the memory of the worker module.

In an iterative operation of a deep machine learning model, a very large amount of memory space needs to be occupied for calculating an update gradient based on sample data having tens of thousands of dimensions of characteristics. For example, if sample data is an instance including more than 10,000 characteristic dimensions, tens of gigabits or even hundreds of gigabits of memory space needs to be occupied each time the worker module calculates gradient information. It can be learned that a larger quantity of characteristic dimensions of the sample data indicates a larger amount of storage space in the memory occupied in an iterative operation. In a manner of reading sample data in batches and calculating a plurality of sets of gradient information, sample data including a large quantity of characteristic dimensions can be read into the memory in batches, thereby reducing the occupied storage space of the memory. In addition, in a process of each iterative operation, more sample data can be read in batches to calculate an update gradient, thereby increasing the convergence speed of the large-scale machine learning model. In a process of an iterative operation of a machine learning model including millions of parameters or even a large model including more than a billion parameters, the convergence speed is increased more significantly.

Setting of a quantity of worker modules and a quantity of model update modules may be classified into the following four cases:

Case 1: There is one worker module, and there is one model update module. In this case, the worker module and the model update module may be located on one computing node.

Figure 3:
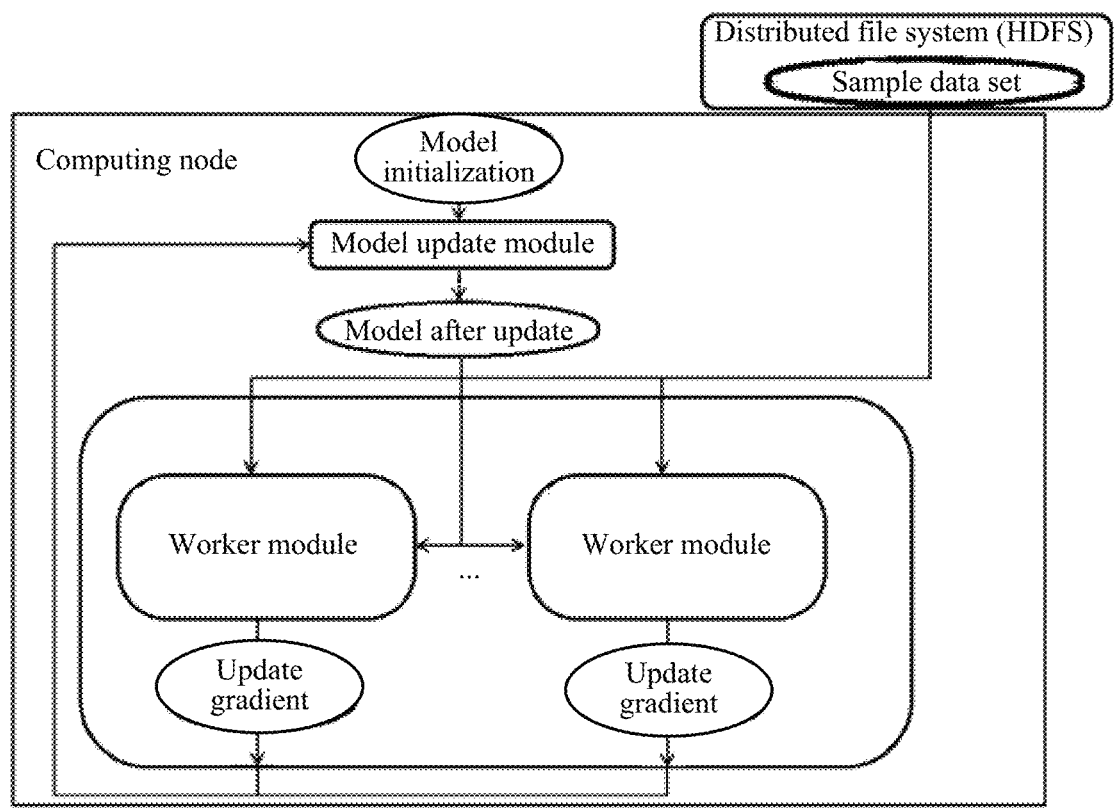
FIG. 3 is a schematic diagram of a first data processing system including a plurality of worker modules and one model update module according to an embodiment of the present invention.

Case 2: As shown in FIG. 3, there is a plurality of worker modules, and there is one model update module. An arrow in FIG. 3 indicates a direction of data transfer and a start point and an end point of data transfer. The model update module is further configured to: receive an update gradient of each parameter sent by each of the plurality of worker modules, and update the machine learning model by using the update gradient of each parameter from each of the plurality of worker modules. In this case, the plurality of worker modules and the model update module may be located on one computing node. Alternatively, the plurality of worker modules and the model update module may be located on a plurality of computing nodes. Specifically, the plurality of worker modules are located on different computing nodes, and the model update module is located on a computing node different from those of the plurality of worker modules. Alternatively, the plurality of worker modules and the model update module may be located on a plurality of computing nodes. Specifically, the plurality of worker modules are located on different computing nodes, and the model update module is located on a computing node carrying a worker module. In the deployment manners of the worker module and the model update module, if the worker module and the model update module are deployed on a same computing node, hardware resources of the computing node can be utilized efficiently. It should be noted that, in the case 2, sample data subsets read by the plurality of worker modules in each iterative operation may be different.

Figure 4:
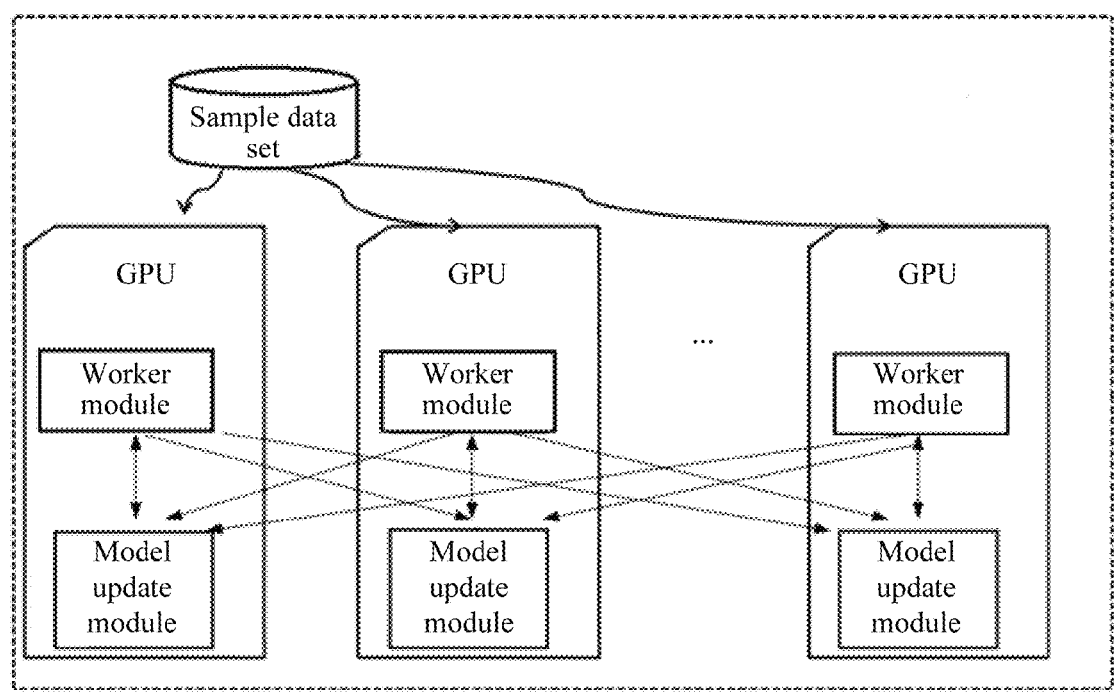
FIG. 4 is a schematic diagram of a first data processing system including a plurality of worker modules and a plurality of model update modules according to an embodiment of the present invention.

Case 3: As shown in FIG. 4, there may be a plurality of worker modules, and there is also a plurality of model update modules. An arrow in FIG. 4 indicates a direction of data transfer and a start point and an end point of data transfer. In this case, the plurality of worker modules and the plurality of model update modules may be located on one computing node. The computing node includes a plurality of processors, and one processor carries one worker module and one model update module. The processor reads and executes an instruction in a memory or runs a hardware logic circuit of the processor, to implement a function of a module carried on the processor.

A worker module of each processor is further configured to: send a calculated update gradient of each parameter to model update modules of all other processors, and send the update gradient of each parameter to a model update module that is on the same processor as the worker module. A model update module of each processor is further configured to: receive an update gradient, sent by a worker module of each of the other processors, of a parameter; update the machine learning model by using the update gradient of the parameter from each of the other processors; and update the machine learning model by using an update gradient calculated by a worker module that is on the same processor as the model update module.

In this case, the processor may be a graphics processing unit or general processing unit (GPU).

Figure 5:
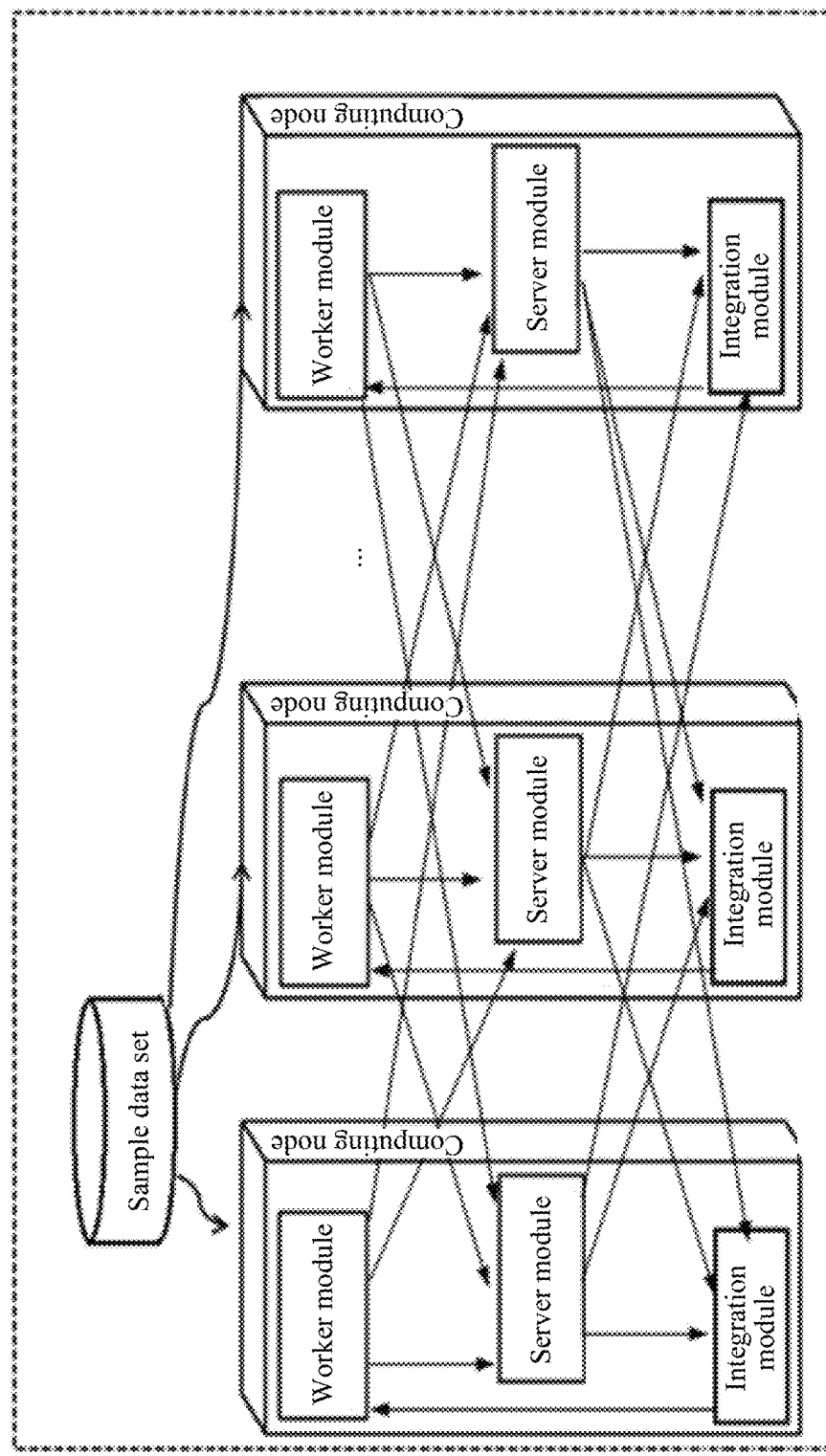
FIG. 5 is a schematic diagram of a first data processing system, in which the model update module includes a plurality of server modules and a plurality of integration modules, according to an embodiment of the present invention.

Case 4: As shown in FIG. 5, the model update module may include a plurality of server modules (which may also be referred to as service modules) and a plurality of integration modules, and there are a plurality of worker modules. An arrow in FIG. 5 indicates a direction of data transfer and a start point and an end point of data transfer. In this case, a process in which a worker module sends an update gradient of each parameter to the model update module includes: sending an update gradient of each set of parameters to a corresponding worker module, where the plurality of parameters of the machine learning model include a plurality of sets of parameters, each set of parameters includes at least one parameter, and each set of the plurality of sets of parameters is corresponding to different worker modules. Each of the plurality of server modules is configured to: receive an update gradient of a set of parameters corresponding to the server module; update, by using the update gradient of the set of parameters, a part that is of the machine learning model and that corresponds to the set of parameters; and send an updated partial machine learning model to each integration module. Each of the plurality of integration modules is configured to: receive updated partial machine learning models sent by the plurality of server modules, and integrate the plurality of updated partial machine learning models into an updated entire machine learning model.

Figure 6:
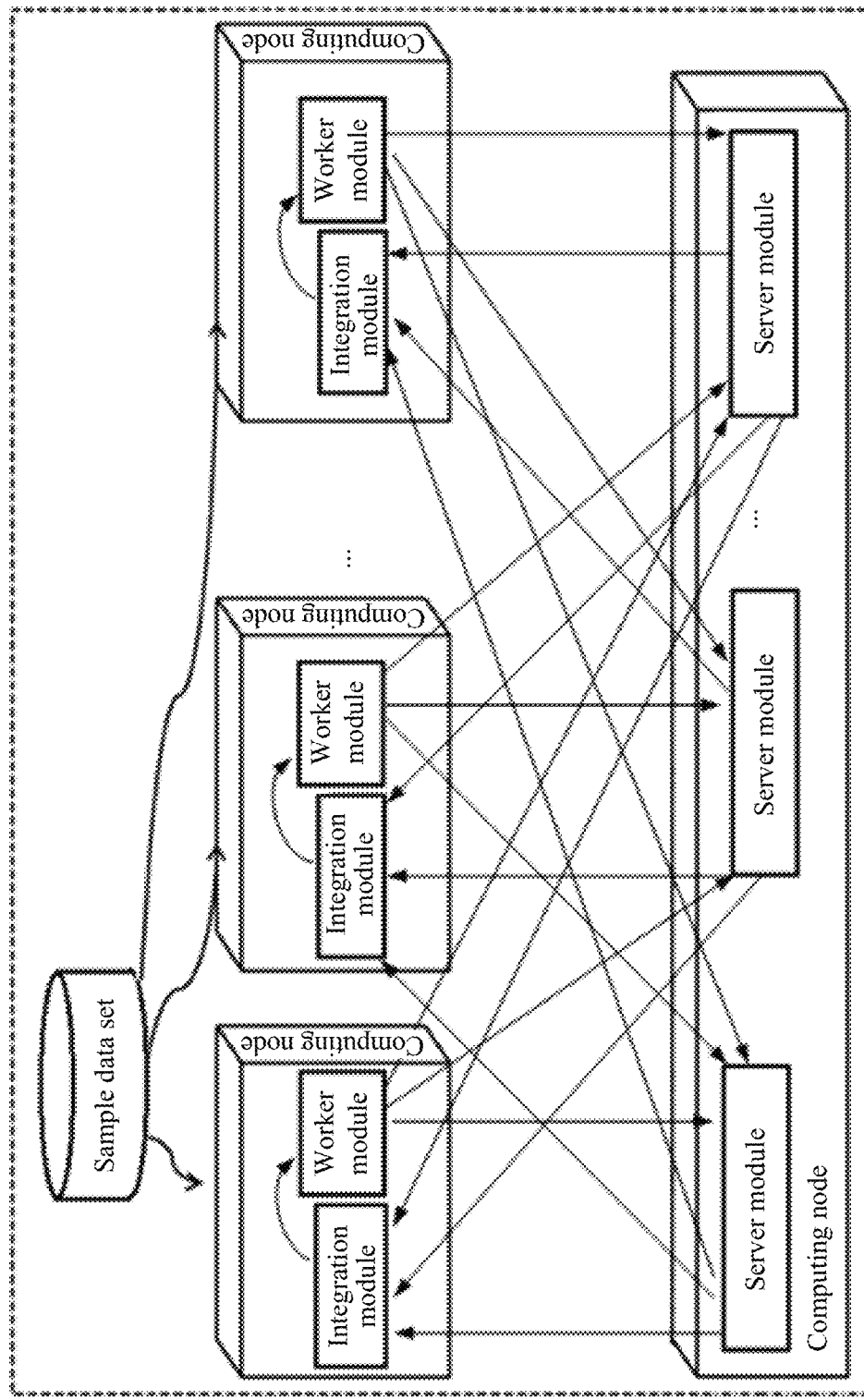
FIG. 6 is a schematic diagram of an implementation of a first data processing system according to an embodiment of the present invention.

In one embodiment, in this case, the plurality of server modules, the plurality of integration modules, and the plurality of worker modules are carried on a plurality of computing nodes. A carrying manner is shown in FIG. 5: Each computing node carries one server module, one integration module, and one worker module. Another carrying manner is shown in FIG. 6: The plurality of server modules are located on one computing node; the plurality of worker modules are located on other computing nodes, and the plurality of worker modules are located on different computing nodes; and the integration modules are located on the computing nodes carrying the worker modules. An integration module and a worker module that are located on a same computing node may be independent of each other or may be integrated. In addition, if a plurality of modules are deployed on a same computing node, hardware resources of the computing node can be utilized efficiently.

In one embodiment, in this case, a process of updating, by using an update gradient of a set of parameters, a part that is of the machine learning model and that corresponds to the set of parameters specifically includes: updating, according to a model update formula of stochastic gradient descent (SGD) and by using the update gradient of the set of parameters, the part that is of the machine learning model and that corresponds to the set of parameters.

The foregoing embodiments of the present invention further have at least the following advantages:

In processes of a plurality of iterative operations for training the machine learning model, the model update module needs to update the machine learning model for a plurality of times, the worker module needs to obtain an updated machine learning model for a plurality of times, and the worker module also needs to calculate an update gradient for a plurality of times, and send the update gradient of each set of parameters to the model update module. In this case, a model update module and a worker module that are located on different computing nodes or located on a same computing node communicate with each other for many times and exchange a large total amount of data, resulting in high communication overheads. Particularly, if the machine learning model includes more than hundreds of millions or even a billion parameters, or hundreds of thousands or even hundreds of iterative calculations are required in a convergence process of the machine learning model, the amount of data exchanged between the model update module and the worker module is more impressive.

In the foregoing embodiments, the worker module does not send a set of gradient information calculated based on one sample data subset to the model update module, but accumulates gradient information calculated based on each of a plurality of sample data subsets and then sends accumulated gradient information to the model update module, reducing a quantity of times of communication between the model update module and the worker module. Particularly, for a machine learning process that includes a large quantity of model parameters and a training process including hundreds of thousands or even millions of continuous iterative operations, a more impressive quantity of times of communication is reduced. In addition, the foregoing embodiments have good scalability, and can be applied to training processes of various types of machine learning models, such as a machine learning model including many parameters, a machine learning model including few parameters, a machine learning model requiring many iterations, and a machine learning model requiring few iterations. In addition, the quantity of times of communication between the model update module and the worker module is reduced, and time taken for communication between the model update module and the worker module is correspondingly reduced, thereby reducing total time of a plurality of iterative operations and increasing a speed of machine learning. If the model update module and the worker module that communicate with each other are located on different computing nodes, reduction of the communication overheads between the model update module and the worker module can lead to reduction of occupied communication resources between the computing nodes, and more obviously, lead to reduction of the time taken for communication between the model update module and the worker module, thereby increasing the convergence speed of the machine learning model more significantly and correspondingly increasing the speed of machine learning. If the model update module and the worker module that communicate with each other are located on different computing nodes, when the solution in the foregoing embodiments is used, even if a communication bandwidth between the computing nodes is relatively low (for example, the communication bandwidth is 1 Gbit/s), the speed of machine learning is not affected seriously. It can be easily learned that the solution in the foregoing embodiments has an especially prominent effect in a harsh usage scenario such as a scenario in which the communication bandwidth is limited.

Various embodiments described in the following are all applicable to the foregoing four cases.

In one embodiment, if the data processing system includes a plurality of computing nodes, the plurality of computing nodes are laid out in a distributed manner.

In one embodiment, the computing node may be a personal computer (PC) or a server.

In one embodiment, the computing node may include at least one processor and a memory configured for the processor, and the worker module, the model update module, the server module, and the integration module are carried on the processor. The processor is configured to read and execute an instruction in the memory or run a hardware logic circuit of the processor, to implement a function of a module carried on the processor. The processor carrying the worker module is configured to read the instruction in the memory configured for the processor, to implement a function of the worker module, and the memory is further configured to store a sample data subset read by the worker module from the sample data set.

In one embodiment, the processor may be an integrated circuit that operates according to a non-fixed instruction or an integrated circuit that operates according to a fixed instruction. A processor operating according to a non-fixed instruction implements, by reading and executing an instruction in a memory, a function of a module carried on the processor. A processor operating according to a fixed instruction implementation, by running a hardware logic circuit of the processor, a function of a module carried on the processor. In a process of running the hardware logic circuit of the processor, the processor operating according to the fixed instruction usually also needs to read some data from the memory or output a running result to the memory. Generally, a processor is configured with a memory. The memory may be located in a storage medium easy to be read by the processor, such as a random access memory (ROM), a flash memory, a read only memory (RAM), a programmable read only memory, an electrically erasable programmable memory, a cache, or a register.

In one embodiment, the processor may be a central processing unit (CPU), a graphics processing unit (GPU), a digital signal processor (DSP), an application-specific integrated circuit (ASIC), a field programmable gate array (FPGA), a network processor (NP), another programmable logic device, a discrete gate or transistor logic device, a discrete hardware component, or the like.

In one embodiment, the worker module may be carried on a GPU or an FPGA, the model update module may be carried on a CPU, the server module may be carried on a CPU, and the integration module may be carried on a CPU. In addition, it should be noted that one processor may carry a plurality of modules.

In one embodiment, the sample data set may be stored in a local disk of the computing node on which the worker module is located or stored in a plurality of distributed storage nodes, for example, an Hadoop distributed file system (HDFS), an Amazon S3 (Amazon Simple Storage Service), and a Google file system (GFS). In the embodiments shown in FIG. 2 and FIG. 3, the sample data set is stored in the HDFS. The worker module reads a plurality of sample data subsets (minibatches) from the sample data set.

In one embodiment, in each iterative operation, the plurality of sample data subsets sequentially read by the worker module from the sample data set are stored in the memory of the worker module; and after gradient information of each parameter is calculated by using one sample data subset, the sample data subset is deleted from the memory before a next sample data subset is read into the memory, and the memory of the worker module is the memory of the processor carrying the worker module.

Storage space occupied by one sample data subset is less than or equal to storage space, reserved for the sample data subset, in the memory of the worker module. Storage space occupied by two sample data subsets is greater than the storage space, reserved for the sample data subset, in the memory of the worker module.

In addition to storing the sample data subsets, the memory of the worker module further needs to store other data, such as the machine learning model, required in calculating gradient information. Therefore, not all the storage space of the memory of the worker module is used to store the sample data subsets.

The storage space occupied by one sample data subset is related to a quantity of characteristic dimensions of sample data. If the sample data has a relatively large quantity of characteristic dimensions, the sample data occupies a relatively large amount of storage space, and correspondingly, one sample data subset occupies a relatively large amount of storage space. Because the sample data subset needs to be stored in the memory, the storage space occupied by one sample data subset cannot be greater than the storage space, reserved for the sample data subset, in the memory.

In one embodiment, in each iterative operation, the worker module is further configured to: in a process of entering each sample data subset into the machine learning model and calculating the gradient information of each of the plurality of parameters of the machine learning model, read and use an intermediate calculation result stored in the memory of the worker module, where the intermediate calculation result is used as input information to calculate the gradient information; and after the intermediate calculation result is used, delete the intermediate calculation result from the memory of the worker module, where an operation of deleting the intermediate calculation result needs to be completed before a next sample data subset is read into the memory of the worker module.

In one embodiment, the intermediate calculation result generally includes data such as an intermediate layer characteristic and an inverted residual. The intermediate calculation result is calculated based on the sample data subset, and one intermediate calculation result is obtained correspondingly based on one sample data subset. An intermediate calculation result corresponding to a sample data subset needs to be used in a process of calculating gradient information, and is not used any more after the gradient information is calculated, and therefore can be deleted. In a process of calculating gradient information by using a next sample data subset, an intermediate calculation result corresponding to the next sample data subset is used.

In one embodiment, the data processing system further includes a preprocessing unit, and the preprocessing unit is configured to: in a process in which the worker module enters one sample data subset into the machine learning model and calculates gradient information of each parameter of the machine learning model, preprocess a next sample data subset, and correspondingly obtain an intermediate calculation result of the next sample data subset. The intermediate calculation result is used as input information for calculation in a process in which the worker module enters the next sample data subset into the machine learning model and calculates gradient information of each of the plurality of parameters of the machine learning model.

The preprocessing unit may be separately carried on one processor. For example, the preprocessing unit may be carried on a CPU. In addition, the preprocessing unit and the worker module may alternatively be carried on one processor. For example, the preprocessing unit and the worker module are carried on a CPU.

In the foregoing embodiments of the present invention, in a process of calculating gradient information by the worker module each time, the memory of the worker module needs to store an intermediate calculation result, the machine learning model before and after update, a sample data subset, and the like. Therefore, a large amount of storage space needs to be occupied in the memory. However, the storage space of the memory of the worker module is limited. For example, space of a video RAM of the GPU carrying the worker module is 12 GB. As a result, an amount of sample data that the worker module can read in each iterative calculation process is limited. In the foregoing embodiments of the present invention, after calculating gradient information, the worker module deletes an intermediate calculation result, releasing storage resources occupied by the intermediate calculation result in the memory and vacating storage space for a to-be-read sample data subset. In this way, the to-be-read sample data subset may include relatively much sample data.

In one embodiment, in each iterative operation, there are specifically two manners of accumulating a plurality of sets of calculated gradient information of each parameter to obtain an update gradient of each parameter:

Manner 1:
obtaining the plurality of sets of gradient information of each parameter based on the plurality of read sample data subsets, and accumulating a plurality of sets of gradient information of a same parameter, to obtain the update gradient of each parameter.

Manner 2:
obtaining one set of gradient information of each parameter based on each sample data subset, and accumulating one set of gradient information of a same parameter, to obtain an accumulation gradient of each parameter, so that a plurality of accumulation gradients of each parameter are obtained based on the plurality of read sample data subsets, and accumulating the plurality of accumulation gradients of each parameter, to obtain the update gradient of each parameter.

In one embodiment, a weighted averaging algorithm or a method of extracting some gradient information and performing weighted processing may be used to perform accumulation processing on gradient information. For example, the following two manners may be used:

Manner 1:
for each parameter, obtaining an update gradient of the parameter using the weighted averaging method on a plurality of sets of calculated gradient information of the parameter.

Manner 2:
For each parameter, extracting some gradient information from a plurality of sets of calculated gradient information of the parameter, and performing weighted processing, to obtain an update gradient of the parameter.

In one embodiment, in a process of entering each sample data subset into the machine learning model and calculating gradient information of each of the plurality of parameters of the machine learning model in a process of each iterative operation, one piece of gradient information of each parameter is obtained correspondingly based on one piece of sample data in the sample data subset, where the sample data subset includes at least one piece of sample data; and correspondingly, one set of gradient information of each parameter is obtained correspondingly based on one sample data subset, where one set of gradient information includes at least one piece of gradient information.

In one embodiment, a process of entering each sample data subset into the machine learning model and calculating gradient information of each of the plurality of parameters of the machine learning model in each iterative operation includes: entering each sample data subset into the machine learning model, and performing forward calculation and backward calculation to obtain the gradient information of each parameter.

In one embodiment, a process of updating the machine learning model by using an update gradient of each parameter in each iterative operation includes: updating the machine learning model according to a model update formula of SGD (Stochastic gradient descent, stochastic gradient descent) and by using the update gradient of each parameter.

In one embodiment, a process of sending, by the model update module, the machine learning model to the worker module is a process of pulling (pull in English) the machine learning model down to the worker module; and a process of sending, by the worker module, an update gradient to the model update module is a process of pushing (push in English) the update gradient up to the model update module.

In one embodiment, a process of sending, by the server module, the machine learning model to the plurality of integration modules is a process of pulling (pull in English) the machine learning model down to the integration modules; and a process of sending, by the worker module, an update gradient to the server module is a process of pushing (push in English) the update gradient up to the server module.

In one embodiment, the machine learning model having an initialized global parameter is a machine learning model in which some or all parameters have initial values.

In one embodiment, the specified quantity of iterations is a quantity of iterations that meets a requirement on precision of the machine learning model.

For a complex machine learning model, usually the model can converge only after hundreds of thousands or even millions of iterative operations. A machine learning model that has converged has relatively high precision. However, if the requirement on the precision of the machine learning model is low, an iterative operation may be stopped when the machine learning model has not converged. In this case, a machine learning model obtained has relatively low precision and only a relatively small quantity of iterative operations need to be performed.

In one embodiment, if there are a plurality of worker modules, in each iterative operation, a total quantity of sample data subsets read by the plurality of worker modules from the sample data set is a quantity of sample data subsets required for one iterative operation of the machine learning model.

In one embodiment, in a process in which the update gradient is transferred between the modules, a presentation form of the update gradient is not limited. For example, the update gradient may be presented as a model updated by using the update gradient. In this way, an operation of updating the model may be omitted after the model is received, or the update gradient is restored after the model is received.

Embodiment of Second Data Processing System

The present invention further provides an embodiment of a second data processing system, which includes a worker module (which may also be referred to as a working module) and a model update module. The worker module and the model update module are configured to: enter sample data in a sample data set into a machine learning model, and perform a plurality of iterative operations, until the machine learning model converges or a specified quantity of iterations are completed in calculation.

In a First Iterative Operation:

The worker module is further configured to: sequentially read a plurality of sample data subsets from the sample data set, where the sample data subset includes at least one piece of sample data; enter each read sample data subset into a machine learning model having an initialized global parameter; calculate gradient information of each of a plurality of parameters of the machine learning model, where after a set of gradient information of each parameter is calculated by using one sample data subset, the sample data subset is deleted before a next sample data subset is read, and another set of gradient information of each parameter is calculated by using the next sample data subset; accumulate a plurality of sets of calculated gradient information of each parameter, to obtain an update gradient of each parameter; and send the update gradient of each parameter to the model update module.

The model update module is further configured to: receive the update gradient of each parameter, and update the machine learning model by using the update gradient of each parameter.

In a Second Iterative Operation:

The worker module is configured to: sequentially read the plurality of sample data subsets from the sample data set; enter each read sample data subset into an updated machine learning model; calculate gradient information of each of the plurality of parameters of the machine learning model, where after a set of gradient information of each parameter is calculated by using one sample data subset, the sample data subset is deleted before a next sample data subset is read, and another set of gradient information of each parameter is calculated by using the next sample data subset; accumulate a plurality of sets of calculated gradient information of each parameter, to obtain a new update gradient of each parameter; and send the newly obtained update gradient of each parameter to the model update module. The model update module is further configured to: receive the newly obtained update gradient of each parameter, and update the machine learning model again by using the newly obtained update gradient of each parameter.

In a subsequent iterative operation, the model update module repeats the actions in the second iterative operation, and the worker module also repeats the actions in the second iterative operation. After the machine learning model is updated by using an update gradient obtained in an iterative operation, a next iterative operation is performed.

In one embodiment, the worker module and the model update module are carried on at least one computing node. In addition, the embodiments of the worker module and the model update module in the embodiments of the first data processing system are all applicable to the worker module and the model update module in the foregoing embodiment of the second data processing system.

It should be noted that a plurality of iterative operations are completed in the foregoing embodiment of the data processing system. Alternatively, only one iterative operation may be performed in the foregoing embodiment of the data processing system.

Embodiment of Data Processing Apparatus

Figure 7:
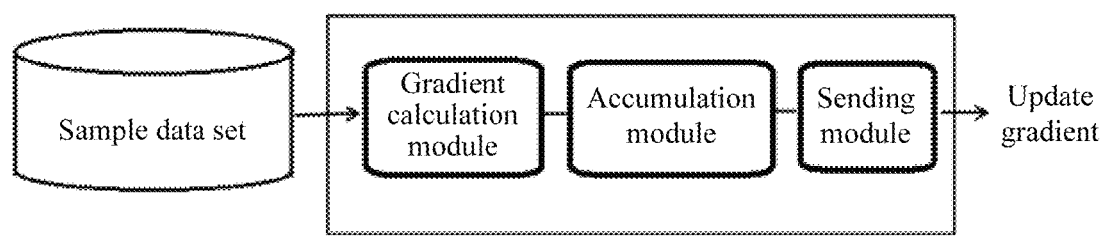
FIG. 7 is a schematic diagram of a data processing apparatus according to an embodiment of the present invention.

As shown in FIG. 7, the present invention provides an embodiment of a data processing apparatus. The data processing apparatus is configured to participate in a plurality of iterative operations in a machine learning process, until a machine learning model converges or a specified quantity of iterations are completed in calculation.

The data processing apparatus includes a gradient calculation module, an accumulation module, and a sending module.

In a First Iterative Operation:

The gradient calculation module is configured to: sequentially read a plurality of sample data subsets from a sample data set, where the sample data subset includes at least one piece of sample data; enter each read sample data subset into a machine learning model having an initialized global parameter; and calculate gradient information of each of a plurality of parameters of the machine learning model, where after a set of gradient information of each parameter is calculated by using one sample data subset, the sample data subset is deleted before a next sample data subset is read, and another set of gradient information of each parameter is calculated by using the next sample data subset. The accumulation module is configured to accumulate a plurality of sets of calculated gradient information of each parameter, to obtain an update gradient of each parameter. The sending module is configured to send the update gradient of each parameter, where the update gradient of each parameter is used to update the machine learning model.

In a Second Iterative Operation:

The gradient calculation module is further configured to: sequentially read the plurality of sample data subsets from the sample data set; enter each read sample data subset into a machine learning model updated by using the update gradient of each parameter; and calculate gradient information of each of the plurality of parameters of the machine learning model, where after a set of gradient information of each parameter is calculated by using one sample data subset, the sample data subset is deleted before a next sample data subset is read, and another set of gradient information of each parameter is calculated by using the next sample data subset. The accumulation module is further configured to accumulate a plurality of sets of calculated gradient information of each parameter, to obtain a new update gradient of each parameter. The sending module is further configured to: send the newly obtained update gradient of each parameter, where the newly obtained update gradient of each parameter is used to update the machine learning model again.

In a subsequent iterative operation, the gradient calculation module, the accumulation module, and the sending module repeat the actions in the second iterative operation. After the machine learning model is updated by using an update gradient obtained in an iterative operation, a next iterative operation is performed.

In one embodiment, the data processing apparatus may be carried on at least one computing node. In addition, the embodiments of the worker module in the foregoing embodiments of the first data processing system may be used for the data processing apparatus.

It should be noted that the foregoing embodiment of the data processing apparatus has participated in a plurality of iterative operations. Alternatively, the foregoing embodiment of the data processing apparatus may participate in only one iterative operation.

Embodiment of First Data Processing Method

The present invention provides an embodiment of a first data processing method. The embodiment includes a processing process of entering sample data in a sample data set into a machine learning model, and performing a plurality of iterative operations until the machine learning model converges or a specified quantity of iterations are completed.

In a first iterative operation, the method includes:
sequentially reading a plurality of sample data subsets from the sample data set, where the sample data subset includes at least one piece of sample data; entering each read sample data subset into a machine learning model having an initialized global parameter; calculating gradient information of each of a plurality of parameters of the machine learning model, where after a set of gradient information of each parameter is calculated by using one sample data subset, the sample data subset is deleted before a next sample data subset is read, and another set of gradient information of each parameter is calculated by using the next sample data subset;
accumulating a plurality of sets of calculated gradient information of each parameter, to obtain an update gradient of each parameter, where the update gradient of each parameter is used to update the machine learning model; and
updating the machine learning model by using the update gradient of each parameter.

In a second iterative operation, the method includes:
sequentially reading the plurality of sample data subsets from the sample data set; entering each read sample data subset into an updated machine learning model; calculating gradient information of each of the plurality of parameters of the machine learning model, where after a set of gradient information of each parameter is calculated by using one sample data subset, the sample data subset is deleted before a next sample data subset is read, and another set of gradient information of each parameter is calculated by using the next sample data subset; and accumulating a plurality of sets of gradient information of each parameter to obtain a new update gradient of each parameter, where the newly obtained update gradient of each parameter is used to update the machine learning model again.

In a subsequent iterative operation, the actions in the second iterative operation are repeated. After the machine learning model is updated by using an update gradient obtained in an iterative operation, a next iterative operation is performed.

In one embodiment, specific implementations of the functions of the worker module and the model update module in the embodiments of the first data processing system and the second data processing system are all applicable to the steps in the foregoing embodiment of the first data processing method.

It should be noted that a plurality of iterative operations are completed in the foregoing embodiment of the data processing method. Alternatively, only one iterative operation may be performed in the foregoing embodiment of the data processing method.

Embodiment of Second Data Processing Method

The present invention provides an embodiment of a second data processing method. The embodiment of the second data processing method includes:
a first iterative operation: sequentially reading a plurality of sample data subsets from a sample data set, where the sample data subset includes at least one piece of sample data; entering each read sample data subset into a machine learning model having an initialized global parameter; calculating gradient information of each of a plurality of parameters of the machine learning model, where after a set of gradient information of each parameter is calculated by using one sample data subset, the sample data subset is deleted before a next sample data subset is read, and another set of gradient information of each parameter is calculated by using the next sample data subset; and accumulating a plurality of sets of calculated gradient information of each parameter, to obtain an update gradient of each parameter; and
a second iterative operation: sequentially reading the plurality of sample data subsets from the sample data set; entering each read sample data subset into a machine learning model updated by using the update gradient of each parameter; calculating gradient information of each of the plurality of parameters of the machine learning model, where after a set of gradient information of each parameter is calculated by using one sample data subset, the sample data subset is deleted before a next sample data subset is read, and another set of gradient information of each parameter is calculated by using the next sample data subset; accumulating a plurality of sets of calculated gradient information of each parameter, to obtain a new update gradient of each parameter; and updating the machine learning model again by using the newly obtained update gradient of each parameter.

The method further includes a plurality of iterative operations until the machine learning model converges or a specified quantity of iterations are completed in calculation. In a subsequent iterative operation, the steps in the second iterative operation are repeated. In addition, after the machine learning model is updated by using an update gradient obtained in an iterative operation, a next iterative operation is performed.

In one embodiment, specific implementations of the worker module in the embodiments of the first data processing system and the second data processing system are all applicable to the steps in the foregoing embodiment of the second data processing method.

It should be noted that a plurality of iterative operations are completed in the foregoing embodiment of the data processing method. Alternatively, only one iterative operation may be performed in the foregoing embodiment of the data processing method.

Figure 8:
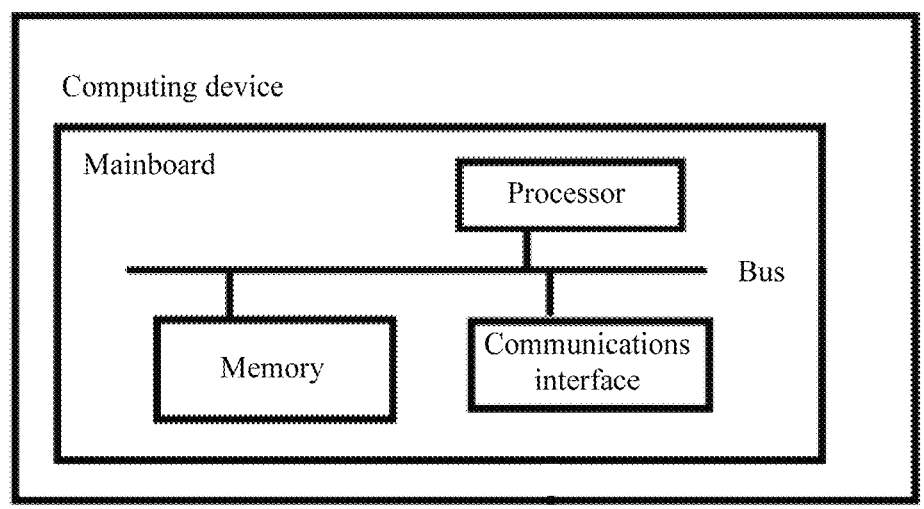
FIG. 8 is a schematic diagram of a computing device according to an embodiment of the present invention.

As shown in FIG. 8, an embodiment of the present invention further provides a computing device. The computing device includes a mainboard, and a processor, a memory, a bus, and a communications interface that are connected by using the mainboard. The processor is connected to the memory by using the bus. When the computing device runs, the processor reads and executes an instruction in the memory or runs a hardware logic circuit of the processor, to make the computing device execute the embodiments of the foregoing data processing methods, and reads a sample data subset into the memory by using the communications interface.

To facilitate understanding of the embodiments of the present invention, the following provides two specific examples, and detail features in the two examples may be combined with any of the foregoing embodiments.

Example 1

Application scenario: Sample data in an image sample data set is divided into 1000 categories using a deep neural network model.

Sample data set: The sample data set is the image sample data set (also referred to as imagenet), and a data volume of the sample data set is 1.28 million images.

Deep neural network model: A Resnet-152 model is used. The Resnet-152 model is currently a relatively common image classification network model with relatively high classification accuracy. The Resnet-152 model has 50 million model parameters, and is a type of large-scale machine learning model.

Distributed computing platform: The distributed computing platform includes four computing nodes. Each computing node includes one worker module, one integration module, and one server module. Each worker module uses one K80 GPU card (12 GB video RAM), and each server module uses one Intel Xeon ES-2620 CPU.

A first iterative operation is used as an example for description:

① The distributed computing platform is started, an application program is deployed, and a global model parameter is initialized, so that a value of the parameter complies with W−(0,0.01).

② It is set that a total volume of data processed by four worker modules is 256 images during each iterative model update. Because space of a video RAM of each K80 GPU card is limited, a worker module can read only one 224*224 image at a time, and calculate gradient information of the model based on the single image (while a GPU of a computing node is calculating the gradient information, a CPU of the computing node reads and preprocesses a next image). Each worker module calculates gradient information based on the machine learning model W−(0,0.01) having the initialized global model parameter, and accumulates gradient information calculated based on each of 64 images. In this case, operations of accumulated update gradients obtained by the four worker modules are respectively represented by using the following formulas:

$$\Delta w_1 = \Delta w_1^1 + \Delta w_1^2 + \ldots + \Delta w_1^{64}$$

$$\Delta w_2 = \Delta w_2^1 + \Delta w_2^2 + \ldots + \Delta w_2^{64}$$

$$\Delta w_3 = \Delta w_3^1 + \Delta w_3^2 + \ldots + \Delta w_3^{64}$$

$$\Delta w_4 = \Delta w_4^1 + \Delta w_4^2 + \ldots + \Delta w_4^{64}$$

Then, the accumulated update gradients $\Delta w_1$, $\Delta w_2$, $\Delta w_3$, and $\Delta w_4$ are respectively pushed up to server modules.

③ It is assumed that a learning rate of the Resnet-152 model is 0.01. After the first iteration (after the first 256 images are processed), each server module updates a part of the model. Specifically, the following formula is used:

$$W_1 = W - 0.01 \cdot 1 \cdot \frac{1}{256}(\Delta w_1 + \Delta w_2 + \Delta w_3 + \Delta w_4)$$

Each server module updates only a part of the model. Each server module sends an updated partial model to each integration module, and each integration module integrates partial models sent by the server modules into an updated complete machine learning model.

Heretofore, the first iteration is completed.

Example 2

In each iterative operation, a worker module needs to continuously process K batches of sample data, where K is a natural number greater than 2, and accumulate gradient information. Specific operations are as follows:

① The worker module obtains a latest model $w_1$ from a model update module.

② The worker module reads a first batch of sample data, calculates gradient information based on the model $w_1$ pulled down by the model update module to obtain $\Delta w_{1\_1}$, and assigns $\Delta w_{1\_1}$ as a value of $\Delta w_1$. In a process in which the worker module calculates the gradient information based on the first batch of sample data, a CPU that is located on a same computing node as the worker module simultaneously reads and preprocesses a second batch of sample data. Specifically, the following formulas are used:

compute $w_1 \rightarrow \Delta w_{1\_1}$ $\Delta w_1 = \Delta w_{1\_1}$

③ The worker module reads the second batch of sample data, calculates gradient information based on the model $w_1$ pulled down by the model update module to obtain $\Delta w_{1\_2}$, and updates $\Delta w_1$. In a process in which the worker module calculates the gradient information based on the second batch of sample data, the CPU that is located on the same computing node as the worker module simultaneously preprocesses a third batch of sample data. Specifically, the following formulas are used:

compute $w_1 \rightarrow \Delta w_{1\_2}$ $\Delta w_1 = \Delta w_1 + \Delta w_{1\_2}$

④ . . .

⑤ The worker module reads a $K^{th}$ batch of sample data, calculates gradient information based on the model $w_1$ pulled down by the model update module to obtain $\Delta w_{1\_K}$, updates $\Delta w_1$, and pushes accumulated gradient information $\Delta w_1$ up to the model update module. Specifically, the following formulas are used:

compute $w_1 \rightarrow \Delta w_{1\_K}$ $\Delta w_1 = \Delta w_1 + \Delta w_{1\_K}$ ⑥ The mode update module updates the machine learning model based on the accumulated gradient information $\Delta w_1$ pushed up by the worker module.

Heretofore, one update of the machine learning model is completed.

Various scenarios to which the foregoing embodiments of the present invention are applicable:

The embodiments of the present invention are all applicable to scenarios for training various machine learning models, such as various large-scale machine learning models and deep learning models.

Various machine learning algorithms are applicable to the embodiments of the present invention, such as a stochastic gradient descent algorithm, a Newton algorithm, a Bayesian algorithm, a convolutional neural network (image, voice, and video) algorithm, a recursive neural network (natural language processing) algorithm, and a deep neural network (voice) algorithm.

Results of machine learning in the embodiments of the present invention may be used in the following aspects: monitoring of an operator network traffic exception, a technology of a smart album on a terminal, information technology (IT) product line video surveillance, a self-driving technology, a voice assistant technology, simultaneous interpretation, spam blocking, and the like.

With descriptions of the foregoing implementations, a person skilled in the art may clearly understand that the present invention may be implemented by using software, hardware, firmware or a combination thereof. When the present invention is implemented by using the software, the functions of the foregoing modules or the steps in the method embodiments may be stored in a computer-readable medium, and transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The computer-readable medium may include a RAM, a ROM, an EEPROM, a CD-ROM, an optical disc storage medium, a magnetic disk storage medium, a magnetic storage device, or any other computer-accessible medium that can carry or store program code including an instruction or a data structure. A communications medium in any form can be the communications medium. If the software is transmitted between a website, a server, and another node by using a wired technology such as a coaxial cable, an optical fiber cable, a twisted pair, or a digital subscriber line (DSL), or a wireless technology such as infrared, radio, or microwave, the coaxial cable, optical fiber cable, twisted pair, DSL, infrared, radio, and microwave are included in a definition of the communications medium. The computer-readable medium may further include a disk or a disc. A disc includes a compact disc (CD), a laser disc, an optical disc, a digital versatile disc (DVD), a Blu-ray disc, or the like. A disk includes a floppy disk or a hard disk. The disk usually copies and stores data by using a magnetic technology, and the disc copies and stores data by using an optical technology such as laser.

In summary, what is described above is merely example embodiments of the technical solutions of the present invention, but is not intended to limit the protection scope of the present invention. Any modification, equivalent replacement, or improvement made without departing from the spirit and principle of the present invention shall fall within the protection scope of the present invention.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data processing system, wherein the data processing system comprises at least one processor; and
a memory coupled to the at least one processor to store program instructions, which when executed by the at least one processor, cause the at least one processor to:
in a process of one iterative operation, sequentially read a plurality of sample data subsets from a sample data set, wherein each sample data subset comprises at least one piece of sample data;
enter each read sample data subset into a machine learning model; and
calculate gradient information of each of a plurality of parameters of the machine learning model, wherein after a set of gradient information of each parameter is calculated using one sample data subset, another set of gradient information of each parameter is calculated using a next sample data subset, and wherein the machine learning model has an initialized global parameter or was updated in a last iterative operation;
in the process of the one iterative operation, accumulate a plurality of sets of gradient information of each parameter to obtain an update gradient of each parameter; and
send the update gradient of each parameter in the process of the one iterative operation, wherein the update gradient of each parameter is used to update the machine learning model.

2. The data processing system according to claim 1, wherein the program instructions further cause the at least one processor to:
participate in a plurality of iterative operations after the one iterative operation, until the machine learning model converges or a specified quantity of iterations are completed in calculation;
in each of the plurality of iterative operations after the one iterative operation, repeat actions in the process of the one iterative operation; and in the one iterative operation and the plurality of iterative operations after the one iterative operation, after the machine learning model is updated using an update gradient obtained in an iterative operation, a next iterative operation is performed.

3. The data processing system according to claim 1, wherein the program instructions further cause the at least one processor to:
for the plurality of sets of gradient information of each parameter that are obtained based on the plurality of read sample data subsets, accumulate a plurality of sets of gradient information of a same parameter to obtain the update gradient of each parameter.

4. The data processing system according to claim 1, wherein the program instructions further cause the at least one processor to:
for one set of gradient information of each parameter obtained based on each sample data subset, accumulate one set of gradient information of a same parameter to obtain an accumulation gradient of each parameter, so that a plurality of accumulation gradients of each parameter are obtained based on the plurality of read sample data subsets, and
accumulate the plurality of accumulation gradients of each parameter to obtain the update gradient of each parameter.

5. The data processing system according to claim 1, wherein the program instructions further cause the at least one processor to:
for the plurality of sets of gradient information of each parameter that are obtained based on the plurality of read sample data subsets, collect a plurality of sets of gradient information of a same parameter together, wherein the plurality of sets of gradient information of each parameter that are collected together are used as the update gradient of each parameter.

6. The data processing system according to claim 1, wherein the program instructions further cause the at least one processor to:
in the process of the one iterative operation, sequentially read the plurality of sample data subsets from the sample data set;
enter each read sample data subset into the machine learning model;
read and use an intermediate calculation result to calculate the gradient information of each of the plurality of parameters of the machine learning model, wherein the intermediate calculation result is used as input information to calculate the gradient information, and after a set of gradient information of each parameter is calculated using one sample data subset, the sample data subset is deleted before a next sample data subset is read, and another set of gradient information of each parameter is calculated using the next sample data subset; and after the intermediate calculation result is used, delete the intermediate calculation result, wherein an operation of deleting the intermediate calculation result needs to be completed before the next sample data subset is read.

7. A data processing method, comprising one iterative operation, and the one iterative operation comprises:

sequentially reading a plurality of sample data subsets from a sample data set, wherein each sample data subset comprises at least one piece of sample data;

entering each read sample data subset into a machine learning model; and calculating gradient information of each of a plurality of parameters of the machine learning model, wherein after a set of gradient information of each parameter is calculated using one sample data subset, another set of gradient information of each parameter is calculated using a next sample data subset; and wherein the machine learning model has an initialized global parameter or is updated in a last iterative operation; and accumulating a plurality of sets of gradient information of each parameter to obtain an update gradient of each parameter, wherein the update gradient of each parameter is used to update the machine learning model.

8. The method according to claim 7, wherein the one iterative operation is iteratively performed in a plurality of iterative operations until the machine learning model converges or a specified quantity of iterations are completed in calculation, wherein in each of the plurality of iterative operations after the one iterative operation, after the machine learning model is updated using an update gradient obtained in an iterative operation, a next iterative operation is performed.

9. The method according to claim 7, further comprising updating the machine learning model using the update gradient of each parameter during each iteration operation.

10. The method according to claim 8, wherein accumulating, in each iterative operation, a plurality of sets of gradient information of each parameter to obtain an update gradient of each parameter comprises:

for the plurality of sets of gradient information of each parameter that are obtained based on the plurality of read sample data subsets, accumulating a plurality of sets of gradient information of a same parameter to obtain the update gradient of each parameter.

11. The method according to claim 8, wherein accumulating, in each iterative operation, a plurality of sets of gradient information of each parameter to obtain an update gradient of each parameter comprises:

for one set of gradient information of each parameter obtained based on each sample data subset, accumulating one set of gradient information of a same parameter to obtain an accumulation gradient of each parameter, so that a plurality of accumulation gradients of each parameter are obtained based on the plurality of read sample data subsets, and accumulating the plurality of accumulation gradients of each parameter to obtain the update gradient of each parameter.

12. The method according to claim 8, wherein accumulating, in each iterative operation, a plurality of sets of gradient information of each parameter to obtain an update gradient of each parameter comprises:

for the plurality of sets of gradient information of each parameter that are obtained based on the plurality of read sample data subsets, collecting a plurality of sets of gradient information of a same parameter together, wherein the plurality of sets of gradient information of each parameter that are collected together are used as the update gradient of each parameter.

13. The method according to claim 8, wherein in a process of entering each sample data subset into the machine learning model and calculating gradient information of each of the plurality of parameters of the machine learning model during each iterative operation, one piece of gradient information of each parameter is obtained correspondingly based on one piece of sample data in the sample data subset, wherein the sample data subset comprises at least one piece of sample data; and correspondingly, one set of gradient information of each parameter is obtained correspondingly based on one sample data subset, wherein the one set of gradient information comprises at least one piece of gradient information.

14. The method according to claim 8, wherein updating the machine learning model using an update gradient of each parameter in each iterative operation comprises:

updating the machine learning model according to a model update formula of stochastic gradient descent and using the update gradient of each parameter.

15. The method according to claim 8, wherein the plurality of iterative operations are executed on at least one computing node, and the at least one computing node comprises at least one processor and a memory configured for the at least one processor.

16. The method according to claim 8, wherein in each iterative operation, the plurality of sample data subsets that are sequentially read from the sample data set are stored in a memory, and after gradient information of each parameter is calculated using one sample data subset, the sample data subset is deleted from the memory before a next sample data subset is read into the memory.

17. The method according to claim 16, wherein a storage space occupied by one sample data subset is less than or equal to a storage space reserved for the sample data subset in the memory, and a storage space occupied by two sample data subsets is greater than the storage space reserved for the sample data subset in the memory.

18. The method according to claim 16, further comprising:

in each iterative operation, in a process of entering each sample data subset into the machine learning model and calculating gradient information of each of the plurality of parameters of the machine learning model, reading and using an intermediate calculation result stored in the memory, wherein the intermediate calculation result is used as input information to calculate the gradient information; and after the intermediate calculation result is used, deleting the intermediate calculation result from the memory, wherein an operation of deleting the intermediate calculation result needs to be completed before a next sample data subset is read into the memory.

19. A non-transitory computer-readable storage medium, storing one or more instructions that, when executed by at least one processor, cause the at least one processor to:

sequentially reading a plurality of sample data subsets from a sample data set, wherein each sample data subset comprises at least one piece of sample data;

entering each read sample data subset into a machine learning model;

calculating gradient information of each of a plurality of parameters of the machine learning model, wherein after a set of gradient information of each parameter is calculated using one sample data subset, another set of gradient information of each parameter is calculated using a next sample data subset; and wherein the machine learning model has an initialized global parameter or is updated in a last iterative operation; and accumulating a plurality of sets of calculated gradient information of each parameter to obtain an update gradient of each parameter, wherein the update gradient of each parameter is used to update the machine learning model.

* * * * *